US012634863B2

(12) United States Patent
Goel et al.

(10) Patent No.: US 12,634,863 B2
(45) Date of Patent: May 19, 2026

(54) POSITIVE RESOURCE RESPONSE FOR A SUSPENDED RESOURCE

(71) Applicant: Oracle International Corporation, Redwood City, CA (US)

(72) Inventors: Yesh Goel, Bengaluru (IN); Ahmed Akl, Little Elm, TX (US); Amarnath Jayaramachar, Bangalore (IN); Doki Satish Kumar Patro, Bangalore (IN)

(73) Assignee: Oracle International Corporation, Redwood City, CA (US)

( * ) Notice: Subject to any disclaimer, the term of this patent is extended or adjusted under 35 U.S.C. 154(b) by 481 days.

(21) Appl. No.: 18/158,330

(22) Filed: Jan. 23, 2023

(65) Prior Publication Data

US 2024/0251373 A1 Jul. 25, 2024

(51) Int. Cl.
H04W 60/04 (2009.01)
H04L 43/10 (2022.01)
H04W 48/16 (2009.01)

(52) U.S. Cl.
CPC ............. H04W 60/04 (2013.01); H04L 43/10 (2013.01); H04W 48/16 (2013.01)

(58) Field of Classification Search
CPC ........ H04W 60/04; H04W 48/16; H04L 43/10
See application file for complete search history.

(56) References Cited

U.S. PATENT DOCUMENTS

| | | | |
|---|---|---|---|
| 11,616,711 B1 * | 3/2023 | Cakulev | .............. H04L 41/5058 709/224 |
| 2021/0235254 A1 * | 7/2021 | Farooq | ................... H04W 8/005 |
| 2022/0038999 A1 | 2/2022 | Sapra et al. | |
| 2022/0346188 A1 | 10/2022 | Malhotra | |
| 2022/0394597 A1 | 12/2022 | Goel | |

FOREIGN PATENT DOCUMENTS

WO 2020205145 A1 10/2020

OTHER PUBLICATIONS

Extended European Search Report in EP24153554.1, mailed Jun. 17, 2024, 16 pages.

* cited by examiner

*Primary Examiner* — Ayman A Abaza
*Assistant Examiner* — Van Ta Nguyen

(57) ABSTRACT

Various embodiments of the present technology generally relate to systems and methods for providing a positive resource discovery response for a suspended resource. More specifically, some embodiments relate to monitoring an availability status of resources within a network. If a connection between a resource and a monitoring element is interrupted, the status of the resource may be set to "suspended". However, the interruption may be temporary or localized in nature, and the resource may still be available to service requests. Accordingly, when the monitoring element receives a resource discovery request for resources that all have the "suspended" status, the monitoring element may return a discovery response identifying the suspended resources as available instead of providing a response indicating no available resources.

18 Claims, 6 Drawing Sheets

600

| COMPUTING SYSTEM | | 601 |
|---|---|---|
| STORAGE SYSTEM | | 603 |
| SOFTWARE | | 605 |
| NF DISCOVERY RESPONSE PROCESS | | 606 |
| COMM. I/F SYS. 607 | PROCESSING SYSTEM 602 | USER. I/F SYS. 609 |

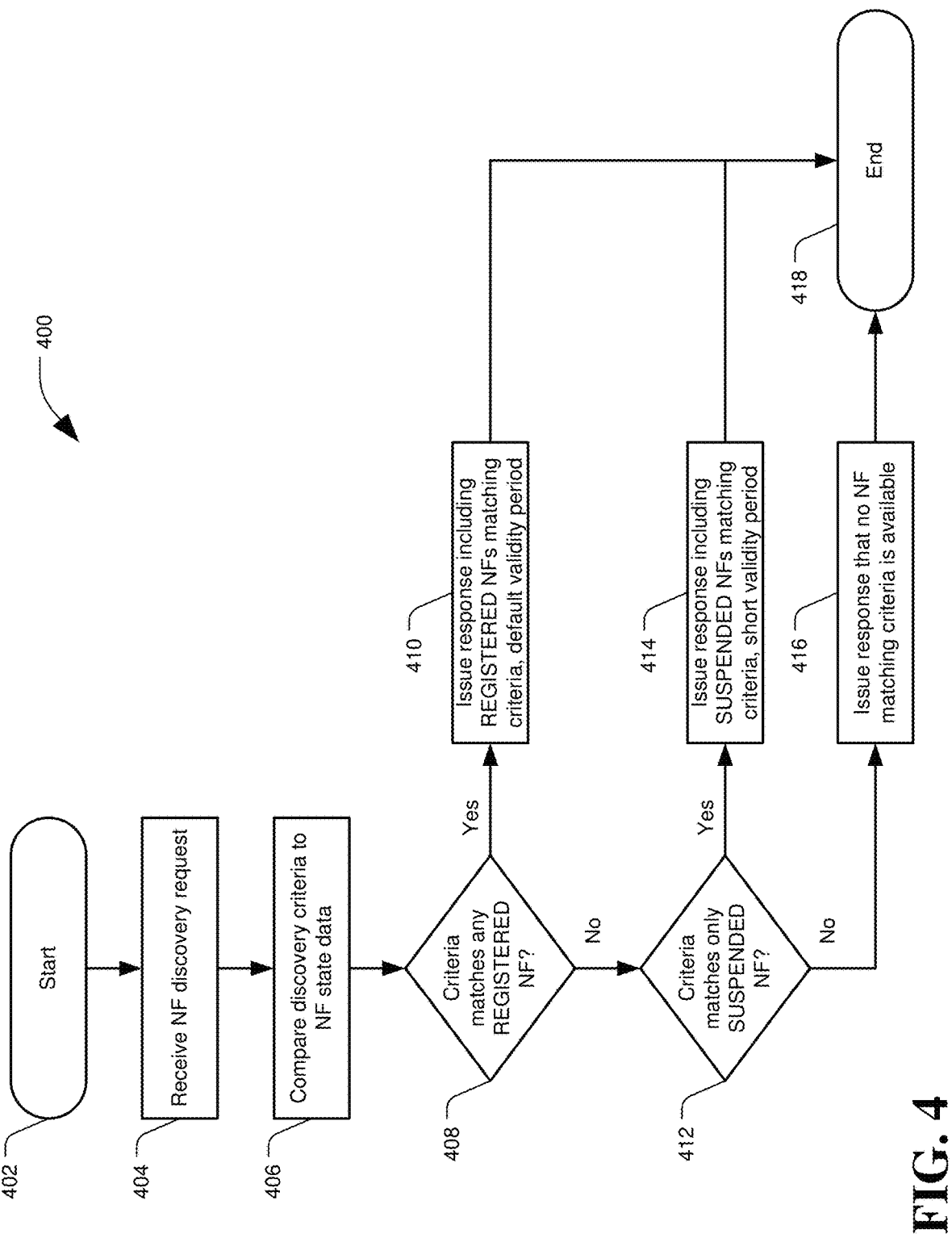

400

402 — Start

404 — Receive NF discovery request

406 — Compare discovery criteria to NF state data

408 — Criteria matches any REGISTERED NF?

Yes → 410 — Issue response including REGISTERED NFs matching criteria, default validity period No 412 — Criteria matches only SUSPENDED NF?

Yes → 414 — Issue response including SUSPENDED NFs matching criteria, short validity period No 416 — Issue response that no NF matching criteria is available 418 — End

FIG. 4

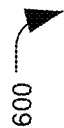
600
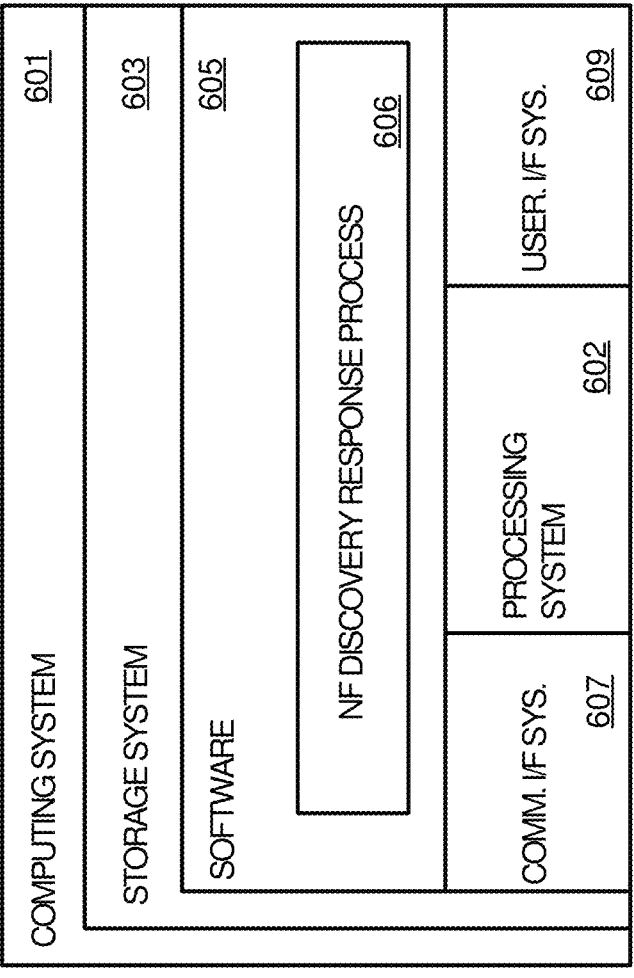
COMPUTING SYSTEM                          601
STORAGE SYSTEM                            603
SOFTWARE                                  605
NF DISCOVERY RESPONSE PROCESS             606
COMM. I/F SYS.   PROCESSING   USER. I/F SYS.
607              SYSTEM       609
                 602
FIG. 6

POSITIVE RESOURCE RESPONSE FOR A SUSPENDED RESOURCE

TECHNICAL FIELD

Various embodiments of the present technology generally relate to management of resources within a network. More specifically, embodiments of the present technology relate to systems and methods for handling discovery requests for resources that currently have a suspended status due to an interruption in connectivity for the resource.

BACKGROUND

Communications networks can be used to connect remote systems and devices, allowing for distributed and efficient processing, resource use, and intercommunication. Within a network, there may be a variety of resources available for access, each resource available from one or more systems. Specifically, network functions (NFs) serve to provide a resource or functionality to various components and user equipment (UE) used on the wireless network. For example, network functions perform tasks such as session management (e.g., session management function (SMF)), policy control (e.g., policy control function (PCF)), access and mobility (e.g., access and mobility management function (AMF)), and so forth. NFs register with network repository functions (NRFs) that store information about the NF, including availability and access information (e.g., a network address for a system or component that provides the NF). If a request for a resource, such as an NF discovery request, is issued for an available NF, the requesting system may be directed to one or more systems to provide that NF, and a resource transaction may be completed. However, if a discovery request is issued, and all NFs that can service the discovery request are unavailable, or "suspended", then the requesting system may be informed there are no NFs available to service the request, and the resource transaction may fail.

An NF within the network may become unavailable or suspended if the NF in question has lost contact with the NRF. While this may occur if an NF goes offline or ceases to function, loss of contact may also occur due to a temporary, localized, or limited interruption in the connectivity between the NF and the NRF, even if the NF is still available for servicing requests in the network. For example, the connection between the NF and the NRF may be interrupted, while the connection between the NF and other network nodes is unaffected. In another example, the connection between the NF and the NRF may be interrupted during an update operation, causing the NF to appear offline even if the interruption has already passed. These temporary interruptions may cause discovery requests to fail unnecessarily, reducing the performance of the network. Accordingly, improvements are needed for addressing inaccurate NF status information and for responding to discovery requests.

The information provided in this section is presented as background information and serves only to assist in any understanding of the present disclosure. No determination has been made and no assertion is made as to whether any of the above might be applicable as prior art with regard to the present disclosure.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments herein relate to systems, methods, and computer-readable storage media for providing a positive response to a query for a suspended resource. In an embodiment, a Network Repository Function (NRF) system may comprise one or more processors, and a memory having stored thereon instructions. The instructions, upon execution, may cause the one or more processors to store registration information for a plurality of network In some examples, the VP provided from the NRF 306 to CNF-2 304 along with suspended results may be set to VP-2. VP-2 may be set to a shorter length or duration than VP-1. By setting a shorter VP on suspended results, it may cause a consumer NF to seek updated producer NFs sooner, which may allow the NRF 306 to provide more updated information in case any NF for the requested service has been updated to "registered", thereby alleviating the failures that may be caused from a consumer NF attempting to access genuinely unavailable producer NFs.functions (NFs), wherein the registration information for each of the plurality of NFs comprises a status value, receive a discovery request including discovery parameters, identify one or more NFs of the plurality of NFs that satisfy the discovery parameters, and in response to determining the status value of each of the one or more NFs indicates a respective NF is suspended, generate a discovery response indicating the one or more NFs are available; and issue the discovery response.

In some embodiments, the NRF system may receive a heartbeat signal from a first NF of the plurality of NFs at expected intervals. In response to receiving the heartbeat signal at an expected interval, the NRF system may set the status value of the first NF to registered, indicating the resource is available, while in response to not receiving the heartbeat signal at the expected interval, the NRF system may set the status value of the first NF to suspended. In an example embodiment, the NRF system may receive a second discovery request comprising second discovery parameters, identify a set of NFs of the plurality of NFs that satisfy the second discovery parameters, and in response to determining the status value of a first subset of the set of NFs indicates the respective NF is suspended and a second subset of the set of NFs indicates the respective NF is available, generate a second discovery response indicating the second subset of the set of NFs are available and not including any of the first subset of the set of NFs. In some embodiments, the NRF system may include a validity period in the discovery response indicating a duration that information in the discovery response remains valid. The NRF system may set the validity period to a first duration shorter than a default duration used in discovery responses including NFs having a status value indicating the respective NF is available. In an example embodiment, the NRF system may determine a type of each of the one or more NFs, and remove any of the one or more NFs from the discovery response that have a type not matching a selected type. The NRF system may receive an operator input to set the selected type of resource. In some embodiments, the NRF system may operate within a 5G wireless network. In an embodiment, the NRF system may determine whether any of the plurality of NFs match the discovery parameters. In response to determining that the one or more NFs satisfy the discovery parameters, the NRF system may determine the status value of each of the one or more NFs. In response to determining that none of the plurality of NFs match the discovery parameters, the NRF system may generate the discovery response indicating that no NFs are available. In some embodiments, the NRF system may include a priority value in the discovery response for each of the one or more NFs indicating a capacity of a corresponding NF to service a resource transaction.

In an alternative embodiment, a method may comprise operating a network repository function (NRF) of a mobile network, including storing registration information for a plurality of network functions (NFs), wherein the registration information for each of the plurality of NFs comprises a status value, receiving a discovery request including discovery parameters, and identifying one or more NFs of the plurality of NFs that satisfy the discovery parameters. In response to determining the status value of each of the one or more NFs indicates a respective NF is suspended, the method may include generating a discovery response indicating the one or more NFs are available, and issuing the discovery response.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 4 depicts a flowchart of an example method for providing a positive resource discovery response for a suspended resource, in accordance with certain embodiments of the present disclosure;

FIG. 6 illustrates a computing system configured to provide a positive resource response for a suspended resource, in accordance with some embodiments of the present technology.

Figure 1:
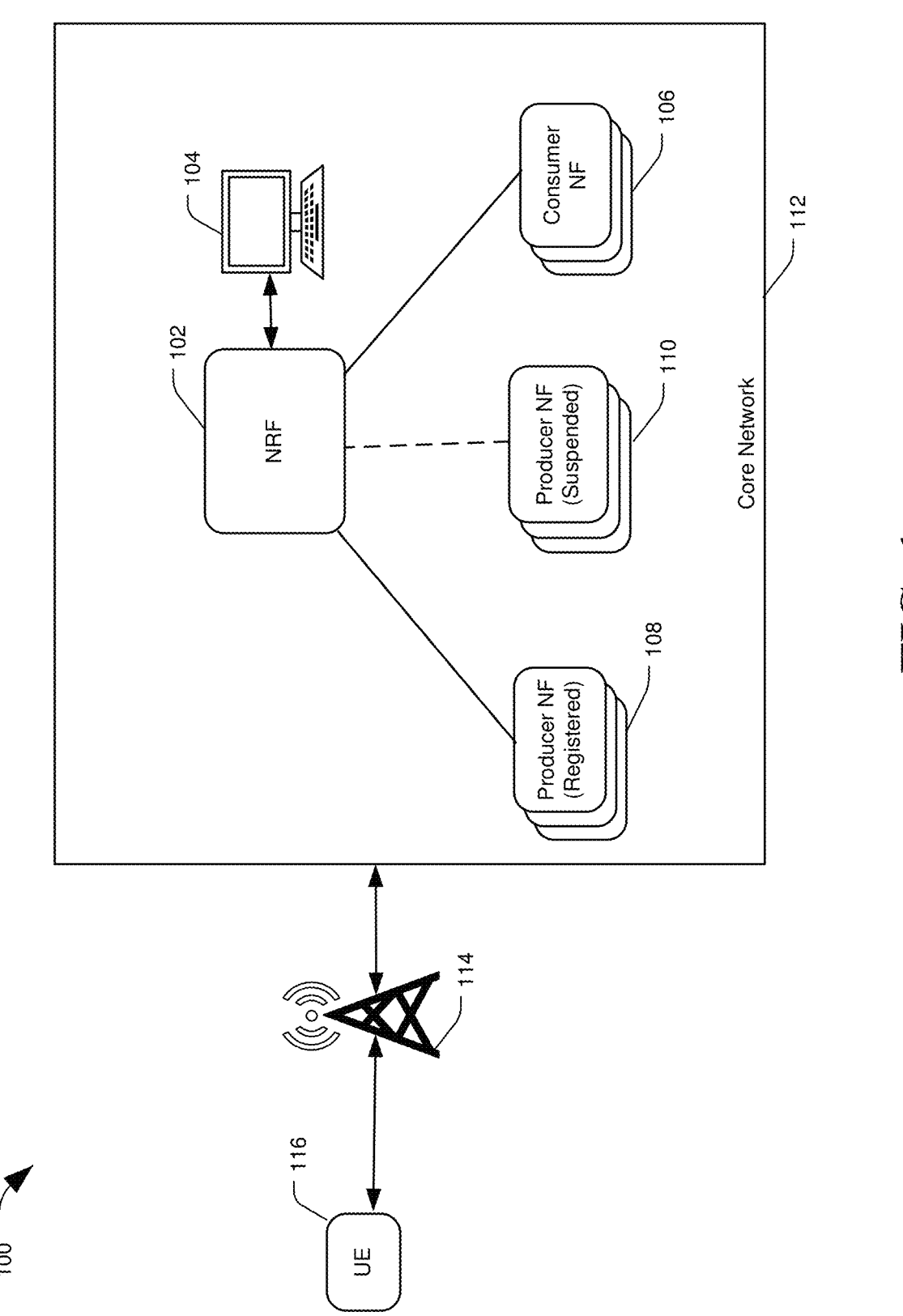
FIG. 1 is a diagram of an operational environment of a system configured to provide a positive resource response for a suspended resource, in accordance with certain embodiments of the present disclosure.

Some components or operations may be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure. The following description and associated figures teach the best mode of the invention. For the purpose of teaching inventive principles, some aspects of the best mode may be simplified or omitted.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

FIG. 1 is a diagram of a system 100 configured to provide a positive resource response for a suspended resource, in accordance with certain embodiments of the present disclosure. The example system 100 may include a 5G mobile network implementing 3GPP (3rd Generation Partnership Project) communication standards (e.g., using the TS 29.510 technical specification) having network functions (NFs) as resources, although the present disclosure may apply to other communication networks and associated resources. The system 100 may include one or more user equipment (UE) 116 connected to a core network 112 via network connectivity components 114.

UE 116 may be a device, system, or module that may utilize the resources of the core network 112, such as to establish mobile communications with another UE. UE 116 may include mobile devices such as cell phones, tablets, or modems.

Network connectivity components 114 may comprise components that enable communication over communication links, such as network cards, ports, radio frequency (RF) modules, telecommunications channels, cell towers, processing circuitry and software, or other communication components. Network connectivity components 114 may include metallic, wireless, cellular, or optical links, using various communication formats and protocols. In some examples, network connectivity components 114 may simply be referred to as a "network" by which systems or modules are connected or communicate.

The core network 112 may include the part of a mobile communications network that provides services to UEs through the network connectivity components 114. The core network 112 may include a plurality of NFs 106, 108, 110, and a network repository function or NF repositiory function (NRF) 102. The components of core network 112, such as NRF 102, may have settings or configurations that may be selected or modified via a user interface or terminal 104, which may be part of or remote to the core network 112. The components of core network 112, or the physical devices implementing them, may be co-located, remotely distributed, or any combination thereof.

Each or any of UE 116, NRF 102, NFs 106, 108, 110, terminal 104, and network 114 may be implemented via computers, servers, hardware and software modules, or other system components. The elements of system 100 may include components hosted or situated in the cloud, and implemented as software modules potentially distributed across one or more server devices or other physical components.

Network functions (NFs) 106, 108, 110 may act as functional building blocks of the network infrastructure. Each NF may have a well-defined external interface (e.g., a communications or software interface expecting specified inputs and producing specified outputs) and functional behavior, and may include a network node or module, a physical appliance, or other component. For example, network functions perform tasks such as session management (e.g., session management function (SMF)), policy control (e.g., policy control function (PCF)), access and mobility (e.g., access and mobility management function (AMF)), data management (e.g., unified data management function (UDM)) and so forth. In the depicted example, NFs may be categorized as consumer NFs 106, producer NFs (registered) 108, and producer NFs (suspended) 110. The distinctions between these NF components will be addressed below.

A network repository function or NF repositiory function (NRF) 102 may be a monitoring element which includes and maintains a repository of the NF elements of the network, including what services or resources each provides. The NRF 102 may perform both discovery operations to add NFs to the NRF, as well as operations to keep the NRF updated. For example, NFs may register with the NRF to provide registration information for the NF to the NRF for storing in the repository. Once an NF is registered with the NRF, the NRF may provide information for the NF in response to discovery requests. Further, the NRF 102 may receive heartbeat signals or updates at regular or expected intervals from the various NFs 106, 108, 110. While heartbeat signals are received at the expected intervals, the corresponding NF may have its status in the repository set as "registered" or active, indicating the NF is able to receive service requests. When one or more heartbeat signals are not received at the expected intervals, the corresponding NF may have its status set to "suspended" or inactive, indicating the NF is unable to receive service requests.

In some embodiments, the NRF 102 may be accessed, or its functions may be modified, via a user or operator interface 104. For example, the operation of how the NRF 102 responds to discovery requests for suspended NFs may be modified or selected via the interface 104. The interface 104 may include a graphical user interface (GUI) accessible via a computing device, such as a computer terminal, workstation, desktop computer, laptop computer, mobile phone, or other device. An interface computing device 104 may be physically connected to one or more systems implementing the NRF 102, or may access the NRF 102 remotely (e.g., over network 114).

In the depicted example, NFs may be categorized as consumer NFs 106, producer NFs (registered) 108, and producer NFs (suspended) 110. A consumer NF 106 may include an NF issuing a discovery or resource request (e.g., to NRF 102) in order to access a resource provided by a producer NF. A producer NF 108, 110 may be an NF that offers a resource corresponding to a resource request from a consumer NF 106. A producer NF (registered) 108 may be an NF that is included in the NRF 102, and is categorized as "registered" or active, for example due to the NRF 102 receiving a heartbeat indicating that the producer NF (registered) 108 is still connected and available in the network. A producer NF (suspended) 110 may be an NF that is included in the NRF 102, but is categorized as "suspended" or inactive, for example due to the NRF 102 not receiving one or more expected heartbeats, indicating that the producer NF (suspended) 110 is not online or is currently unavailable to service resource requests. The dashed connection between producer NF (suspended) 110 and NRF 102 indicates that the connection between the NF 110 and at least NRF 102 was at least temporarily interrupted, although it is possible that a connection (not shown) between the producer NF (suspended) 110 and other NFs was never interrupted. While the NFs in the depicted example are categorized into "consumer" and "producer" NFs, the distinction may be purely based on which nodes are currently issuing NF discovery requests and which nodes may match or satisfy the requested criteria. A consumer NF may provide resources to the network, and may be a producer NF to other NF discovery requests, and likewise a producer NF may issue a discovery request and be a consumer NF.

A consumer NF 106 may issue an NF discovery or resource request to the NRF 102 to locate a specified resource or functionality. The NRF 102 may consult the NF repository for producer NFs 108, 110 that satisfy the requested criteria. According to the 3GPP specification, the NRF 102 may only include data for producer NFs (registered) 108 in the discovery response. In case all producer NFs matching the discovery search criteria are in a suspended state, the NRF 102 may respond to the consumer NF 106 with a response indicating that no resources are available that satisfy the discovery request. Since the consumer NF 106 doesn't receive any producer NF data in the response, the consumer NF 106 may fail the transaction for which it issued the discovery request, resulting in failed calls or network operations.

However, there may be instances in which NFs fail to exchange regular heartbeats with the NRF 102 due to temporary network issues, or network issues only between the producer NF (suspended) 110 and the NRF 102, even though the producer NF (suspended) 110 may still be active and capable of handling service requests. Accordingly, the NRF 102 may be configured (e.g., via settings selected using terminal 104) to respond to discovery requests from a consumer NF 106 with producer NFs (suspended) 110 in selected circumstances. The implementation is discussed in regard to FIGS. 2-3.

Figure 2:
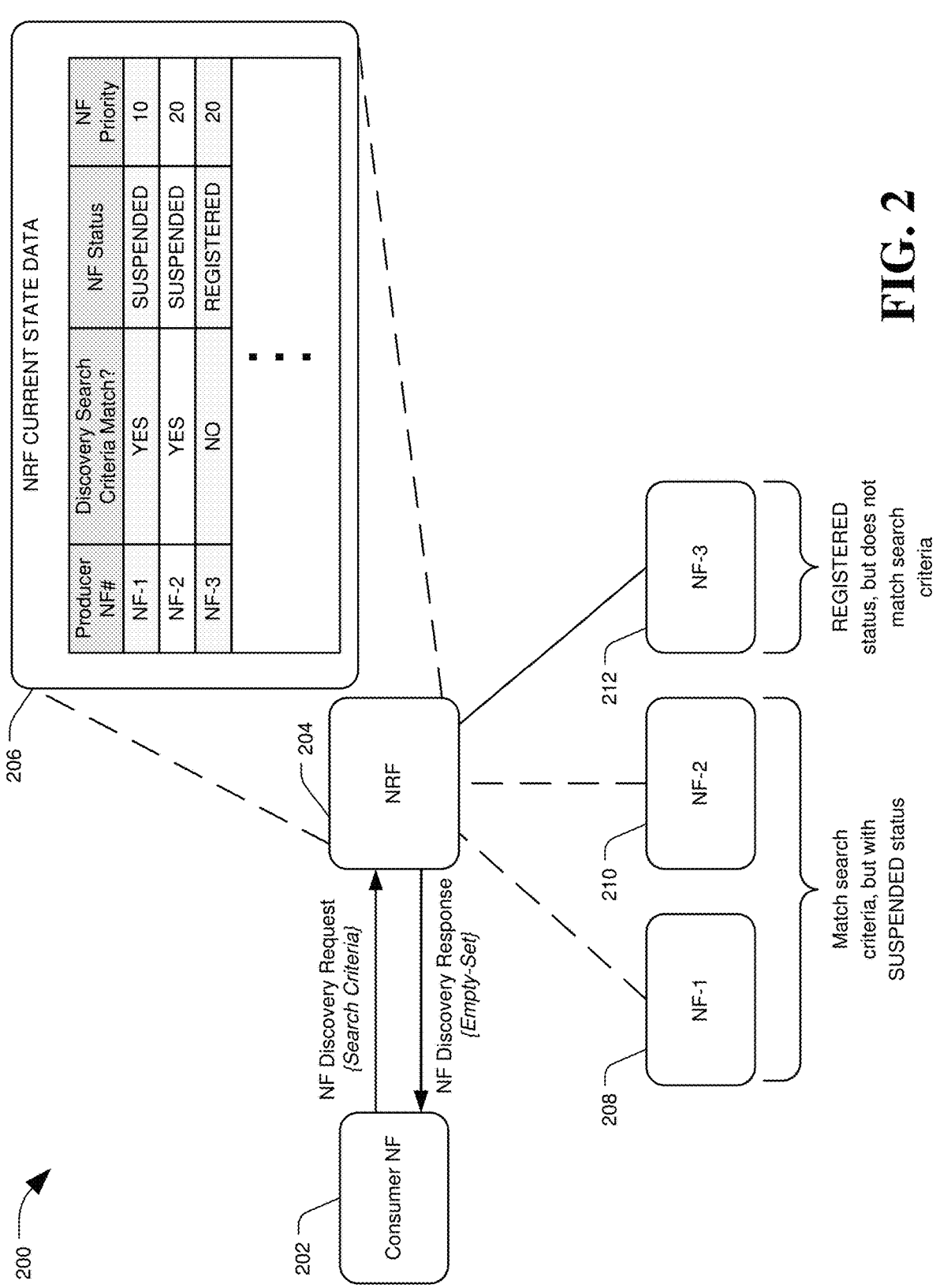
FIG. 2 is a diagram of a system configured to provide a resource response for a resource discovery request, in accordance with certain embodiments of the present disclosure.

FIG. 2 is a diagram of a system 200 configured to provide a resource response for a resource discovery request, in accordance with certain embodiments of the present disclosure. System 200 may include a consumer NF 202, an NRF 204 and its associated current state data 206 for NFs in the network, and a plurality of producer NFs, NF-1 208, NF-2 210, and NF-3 212.

The NRF 204 may maintain a repository, database, table, or other data structure including status information for NFs in a network. In the example embodiment, the NRF current state table 206 may include fields such as producer NF #, a discovery search criteria match field, an NF status field, and an NF priority field. The producer NF #field may include an identifier for various NFs in the network, which may take the form of a network address, device identifier, module or node identifier, other identifying information, or a combination thereof. The "discovery search criteria match" data field may correspond to one or more data fields that can be used as search criteria in an NF discovery request from a consumer NF 202. For example, search criteria may include a type of NF, a type of service or resource offered by an NF, or other searchable features. The NF status field may identify whether an NF is currently identified as "registered" or "suspended", for example based on whether or not an NF has failed to send an expected update or heartbeat to the NRF 204. The NF priority field may indicate a preference or priority in which multiple NFs may be provided in response to a discovery request, or in which NFs may preferably be accessed if multiple NFs are provided in response to a discovery request. The priority may indicate an NFs capacity to service resource transactions. The priority may be based on a network traffic or work load that an NF may be experiencing (e.g., based on information provided in a previous update or heartbeat message), based on a delay in responsiveness expected for an NF (e.g., based on network bandwidth or location relative to a requesting consumer NF), based on other factors, or a combination thereof. The depicted NRF current state data table 206 may be simplified for ease of explanation, and the NF data maintained by the NRF 204 may include additional or different details, or be in a different format, than the table depicted in FIG. 2.

The embodiment depicted in FIG. 2 may illustrate a process flow for a system set to follow an example 3GPP specification protocol in which suspended NFs are not returned in response to an NF discovery request. In the process, consumer NF 202 may issue an NF discovery request to NRF 204. The discovery request may include one or more search criteria (i.e., discovery parameters), which may identify a desired resource or service, an NF type, or other search criteria. In response to the NF discovery request, the NRF 204 may compare the search criteria to the NFs in the NRF state data table 206 to identify NFs that satisfy the specified request.

NF-1 208 and NF-2 210 match the search criteria, according to NRF table 206, and NF-3 212 does not match the search criteria. NF-3 212 has a status of "registered", but as it does not match the search criteria, the NRF 204 does not include it in the NF discovery response. NF-1 208 and NF-2 210 match the search criteria, but both have a status of "suspended". Because all of the NFs matching the search criteria have a status of suspended, the NRF 204 returns an NF discovery response with an empty set, or a response indicating that no active NFs match the search criteria. Because no NF is included in the NF discovery response, the consumer NF 202 cannot access the necessary resource and its call or operation may fail.

As an alternative approach, when all NFs matching a discovery request are determined to be in a suspended state, the NRF 204 may provide the information for at least some of these NFs in the discovery response. An example of this alternate approach is detailed in FIG. 3.

Figure 3:
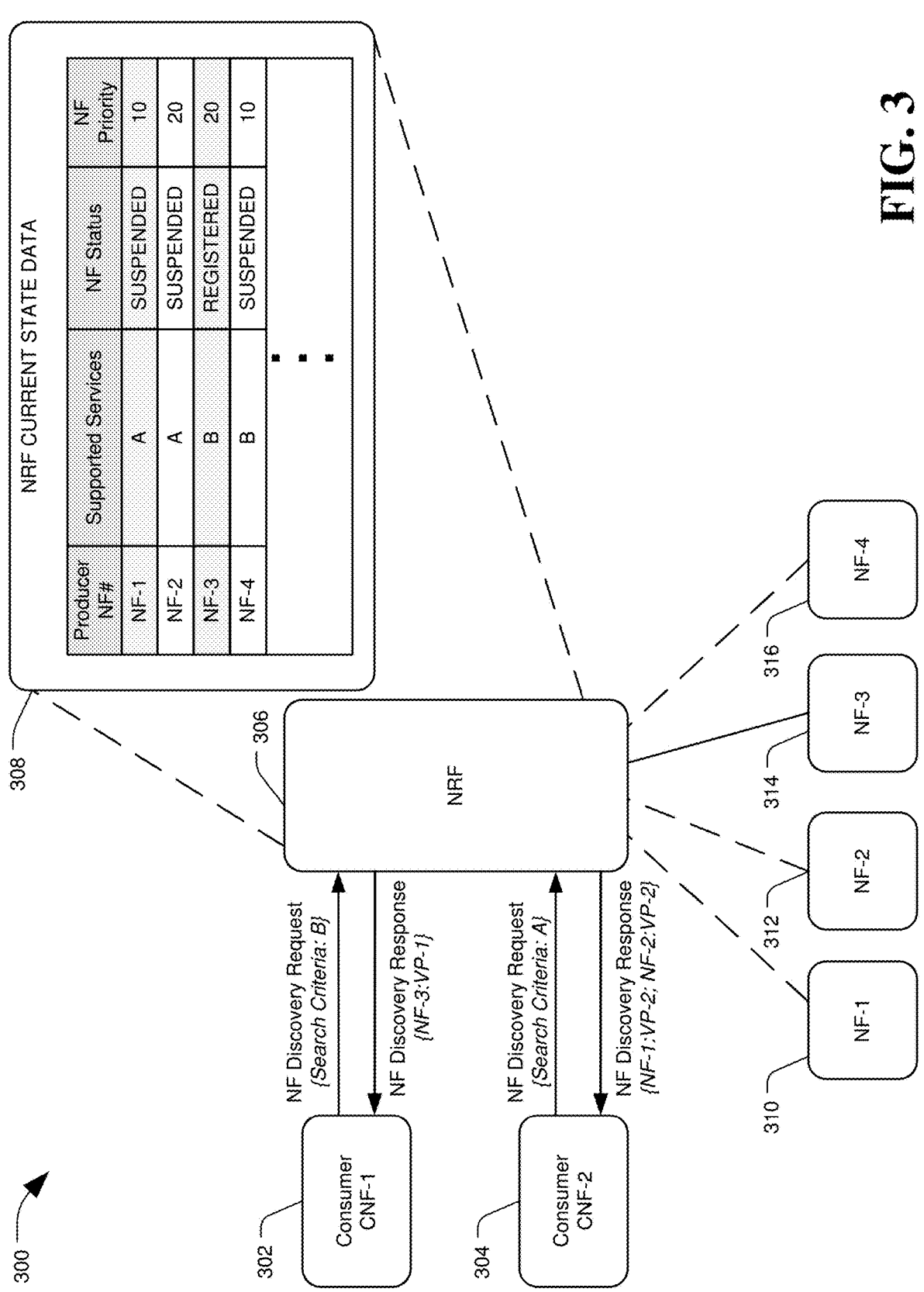
FIG. 3 is a diagram of a system configured to provide a positive resource response for a suspended resource, in accordance with certain embodiments of the present disclosure.

FIG. 3 is a diagram of a system 300 configured to provide a positive resource response for a suspended resource, in accordance with certain embodiments of the present disclosure. System 300 may include a first consumer NF (CNF)-1 302, a second CNF-2 304, an NRF 306 and its associated current state data 308 for NFs in the network, and a plurality of producer NFs, NF-1 310, NF-2 312, NF-3 314, and NF-4 316.

Similar to the state data table 206 of FIG. 2, the state data table 308 includes data on producer NF #, NF status, and NF priority for a plurality of NF devices. As shown, NF-3 314 has an uninterrupted connection to NRF 306, and its status is reflected as "registered" in the state data 308, while the other producer NFs have had interrupted connections and a corresponding status of "suspended". The NRF current state data table 308 also includes information on "supported services" for each NF, which may be an example of searchable criteria that may be included in NF discovery requests from consumer NFs. For example, a discovery request may specify a desired service, which may be compared to the "supported services" data field to determine matching NFs.

FIG. 3 depicts two example discovery requests. In a first discovery request, at least one NF matching the discovery criteria has a "registered" status, and in the second discovery request, all matching NFs have a "suspended" status.

For the first NF discovery request, CNF-1 302 may issue a discovery request, having search criteria B, to NRF 306. The NRF 306 may compare the search criteria B to the "supported services" data field of the state data table 308 to identify producer NFs that may meet the conditions of the discovery request. In this example, NF-3 314 and NF-4 316 both match the requested "B" services. The NRF 306 may then determine the NF status for the matching NFs. NF-3 314 has a "registered" status, and NF-4 316 has a "suspended" status. Accordingly, NF-4 316 is potentially offline or unavailable. Since at least one producer NF has a "registered" status, there may be no need to include a potentially unavailable NF in the discovery results. The NRF 306 may therefore generate and issue an NF discovery response to CNF-1 302, identifying registered NF-3 314 as meeting the search criteria. The discovery response may include information such as addressing details or device ID information which may be used to access NF-3 314.

In addition, the discovery response may include a "validity period" (or "VP") identifier. The validity period may indicate how long the CNF-1 302 should treat the results in the discovery response as valid. Once the validity period has expired, the CNF-1 302 may need to issue a new discovery request to obtain more recent producer NF data. The validity period 1 (or VP-1) returned with the discovery response to CNF-1 302 may be for a default validity period, or a validity period having a first selected duration. The CNF-1 302 may proceed to access NF-3 314 for service requests within VP-1.

For the second NF discovery request, the CNF-2 304 may issue a discovery request having search criteria A to the NRF 306. The NRF 306 may compare the search criteria A to the "supported services" data field of the state data table 308 to identify producer NFs that may meet the conditions of the discovery request. In this example, NF-1 310 and NF-2 312 both match the requested "A" services. The NRF 306 may then determine the NF status for the matching NFs. Both NF-1 310 and NF-2 312 have a status of "suspended".

Since there are no search results having a "registered" status, all potential results have a "suspended" status. Rather than returning no results, the NRF 306 may be configured to instead provide a response identifying one or more of the "suspended" NFs as matching the search criteria. Since NFs with the suspended status may still be available to service received requests, returning the suspended NFs in the results may provide superior service to sending an empty response, guaranteeing a failed call. Accordingly, the NRF 306 may generate and issue a discovery response identifying both NF-1 310 and NF-2 312 to CNF-2 303. The response may potentially identify the results as "registered", even if those NFs are listed as "suspended" in the state data table 308.

In some examples, the VP provided from the NRF 306 to CNF-2 304 along with suspended results may be set to VP-2. VP-2 may be set to a shorter length or duration than VP-1. By setting a shorter VP on suspended results, it may cause a consumer NF to seek updated producer NFs sooner, which may allow the NRF 306 to provide more updated information in case any NF for the requested service has been updated to "registered", thereby alleviating the failures that may be caused from a consumer NF attempting to access genuinely unavailable producer NFs.

CNF-2 304 may proceed to access either NF-1 310 or NF-2 312 to provide the required service, based on the discovery response. If calls to one or more of the NFs fails, the CNF-2 304 may attempt to access other NFs from the discovery response. Therefore, the service call from CNF-2 304 may only fail in the event that all NFs in the discovery response cannot be reached. In such an instance, the call may fail, and the CNF-2 304 may potentially try again with a new NF discovery request to NRF 306. FIG. 4 provides an example flowchart illustrating the process described in regard to FIG. 3.

FIG. 4 depicts a flowchart 400 of an example method to provide a positive resource discovery response for a suspended resource, in accordance with certain embodiments of the present disclosure. In particular, the method of FIG. 4 may depict a process for receiving and responding to a resource discovery request based on a status of NF nodes corresponding to the discovery request. The method may be performed by devices and systems described herein, such as the network or NF repository function (NRF) of FIGS. 1, 2, and 3.

The method may start at 402, and then include receiving a network function (NF) discovery request, at 404. The NF discovery request may be a data packet or message generated and transmitted by a consumer NF to the NRF, and may include discovery search criteria identifying a type of device or service that the consumer NF seeks to utilize. For example, the NF discovery request may include a data field listing a service type which the consumer NF seeks to access.

Based on the received NF discovery request, at 406 the method may include comparing the discovery criteria to NF state data (e.g., maintained in a database, table, or other data structure such as NRF current state data tables 206 and 308). The NRF may maintain a list of NFs in the network, the services or operations supported by each, and a connective status, for example based on monitoring "heartbeat" signals or messages exchanged between the NRF and the NFs. The NRF may compare the type of service specified in the NF discovery request to the services available from the NFs in the NF table to determine if there are any matches.

At 408, a determination may be made whether the discovery criteria matches any NF having a "REGISTERED" status. The REGISTERED status may indicate that an NF is active and available, for example due to successful receipt of heartbeat signals from the NF in question. If there is a match with any REGISTERED NF, the method may include generating and issuing a response to the NF discovery request that identifies one or more of the REGISTERED NFs matching the search criteria, at 410. If any NF from the NRF matches the discovery criteria but does not have a REGISTERED status, it may not be included in the discovery response.

The NF discovery response may also include one or more validity period (VP) indicators. The VP may instruct the consumer NF on how long the information in the discovery response is good for, after which point the consumer NF may be required to issue a new discovery request to continue accessing a corresponding service. A single VP may be associated with all NFs included in the discovery response, or a separate VP may be associated with each individual NF identified in the response, or a combination of grouped and individually-associated VPs may be used. The VP period set in a response with REGISTERED NFs may be set to a first or default time period.

If the search criteria does not match any REGISTERED NFs, at 408, the method may include determining whether the criteria matches only SUSPENDED NFs, at 412. The SUSPENDED status may indicate that an NF is included in the list of NFs in the network, but that it is not active or available, for example due to the NRF not receiving one or more expected heartbeat signals from the NF in question. If the search criteria does match one or more SUSPENDED NF, but does not match any REGISTERED NFs, the method may include generating and issuing a response including one or more of the matching SUSPENDED NFs. In some examples, the VP in the discovery response may be set to a duration that is shorter than a default period, or shorter than the VP for REGISTERED NFs. The shortened VP may cause a customer NF to perform discovery again sooner, and potentially receive an updated response with producer NFs having a REGISTERED status, improving the likelihood that the consumer NF will successfully receive a desired service.

Figure 5:
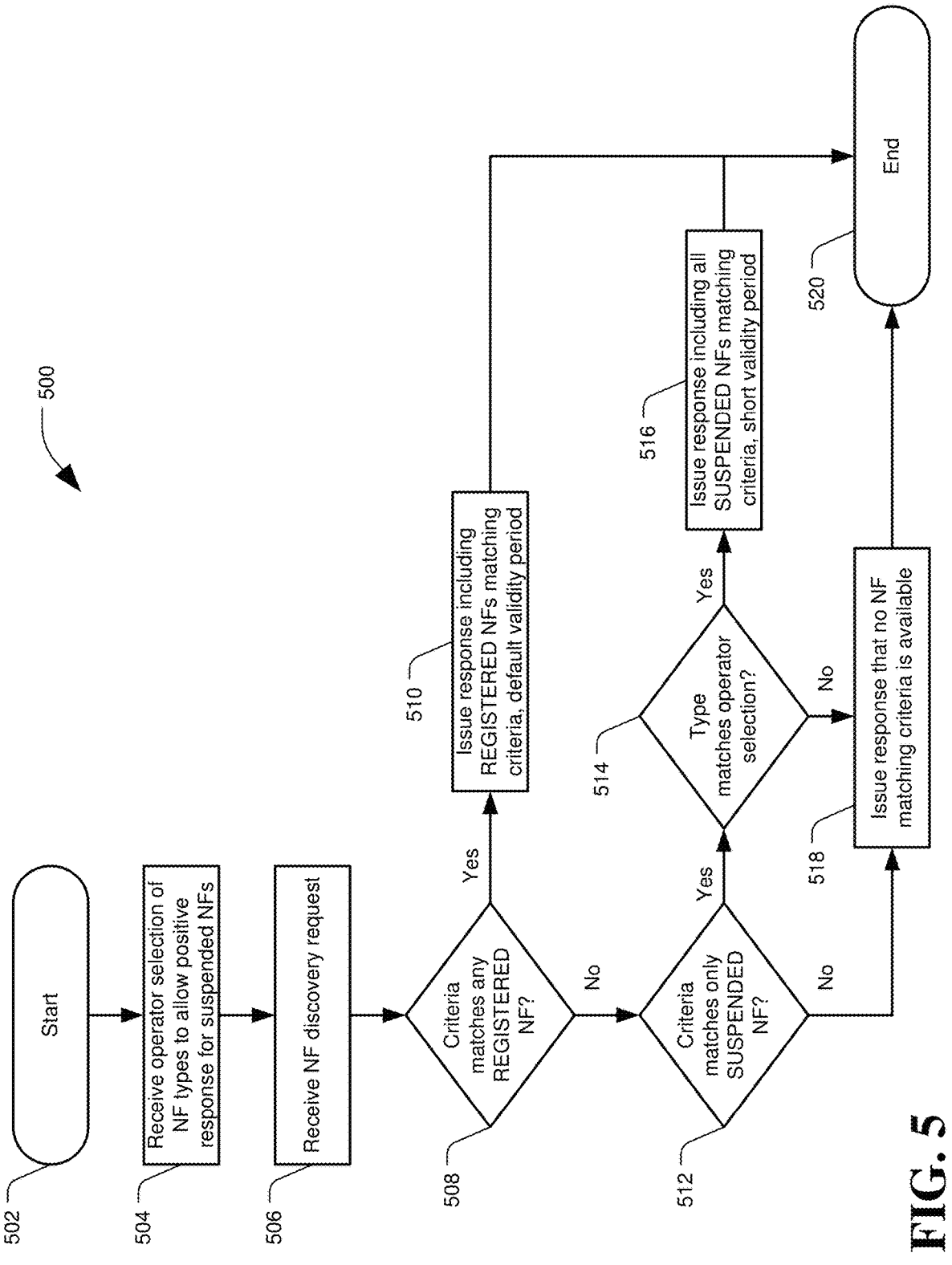
FIG. 5 depicts a flowchart of an example method for providing a positive resource discovery response for a suspended resource based on an operator selection, in accordance with certain embodiments of the present disclosure.

If the search criteria does not match any REGISTERED NFs, at 408, and also does not match any SUSPENDED NFs, at 412, the method may include issuing a discovery response indicating that no NF matching the discovery criteria is available, at 416. After issuing a discovery response at 410, 414, or 416, the method may end, at 418. FIG. 5 depicts an alternate example embodiment of the method of FIG. 4.

FIG. 5 depicts a flowchart 500 of an example method to provide a positive resource discovery response for a suspended resource, in accordance with certain embodiments of the present disclosure. In particular, the method of FIG. 5 may depict a process for receiving and responding to a resource discovery request, where an operator or administrator may modify the response operation based on an NF type. The method may be performed by devices and systems described herein, such as the network or NF repository function (NRF) of FIGS. 1, 2, and 3. For example, a system administrator or human operator may manage discovery response settings of an NRF 102 via a console or computer workstation 104 of FIG. 1.

The method may include starting at 502, and receiving an operator input or selection of NF types for which to enable providing positive responses to discovery requests for suspended NFs, at 504. The NRF may be configured to enable positive responses to requests that match suspended NFs for only selected types of services or NFs, while returning a null set or negative response for other types of suspended NFs. For example, certain types of NFs may be more prone to intermittent connection failures that may result in false SUSPENDED statuses than other NF types, or some NF types may be more important, such that issuing a negative response to discovery requests is less desirable. Accordingly, a user or operator may select NF or service types for which positive responses for suspended NFs is enabled, while other types of NFs may only result in negative discovery responses if all matching NFs are suspended. The operator may input the selections via a user interface, such as a configuration program or web app for the NRF. The selection or setting may be stored to a memory of the NRF for use when processing discovery requests.

Similar to the method of FIG. 4, the method of FIG. 5 may include receiving an NF discovery request, at 506, and determining whether the search criteria of the request matches any REGISTERED NFs, at 508. If so, the method may include issuing a discovery response at 510, including at least one REGISTERED NF matching the search criteria, and a default VP. The response may not include any NFs that do not have the REGISTERED status.

If the discovery request criteria does not match any REGISTERED NFs, the method may include determining whether the criteria maches any SUSPENDED NFs, at 512. If so, at 514 a determination may be made whether a type of one of more of the matching SUSPENDED NFs matches a type selection received from an operator at 504. If so, then the method may include issuing a discovery response including one or more SUSPENDED NFs matching the discovery criteria, and may further include a shortened VP indication, at 516. In the event that multiple types of NFs meet the discovery criteria, only those enabled by an operator for positive responses on SUSPENDED status may be included in the discovery response, and non-selected NF types may not be included.

If the criteria in the discovery request does not match any REGISTERED or SUSPENDED NFs at 508 and 512, or if the NF type of matching SUSPENDED NFs were not selected by an operator at 514, the method may include issuing a discovery response indicating that no NF matching the criteria is available, at 518. After issuing a discovery response at 510, 516, or 518, the method may end, at 520. A computing system configured to perform the operations of the methods of FIGS. 4 and 5 is described in regard to FIG. 6.

FIG. 6 illustrates an apparatus 600 including a computing system 601 that is representative of any system or collection of systems in which the various processes, systems, programs, services, and scenarios disclosed herein may be implemented. Examples of computing system 601 include, but are not limited to, desktop computers, laptop computers, server computers, routers, web servers, cloud computing platforms, and data center equipment, as well as any other type of physical or virtual server machine, physical or virtual router, container, and any variation or combination thereof.

Computing system 601 may be implemented as a single apparatus, system, or device or may be implemented in a distributed manner as multiple apparatuses, systems, or devices. Computing system 601 may include, but is not limited to, processing system 602, storage system 603, software 605, communication interface system 607, and user interface system 609. Processing system 602 may be operatively coupled with storage system 603, communication interface system 607, and user interface system 609.

Processing system 602 may load and execute software 605 from storage system 603. Software 605 may include and implement NF discovery response process 606, which may be representative of any of the operations for providing a positive resource discovery response for suspended resources discussed with respect to the preceding Figures. When executed by processing system 602 to receive and respond to a resource discovery request, software 605 may direct processing system 602 to operate as described herein for at least the various processes, operational scenarios, and sequences discussed in the foregoing implementations.

Computing system 601 may optionally include additional devices, features, or functionality not discussed for purposes of brevity.

In some embodiments, processing system 602 may comprise a micro-processor and other circuitry that retrieves and executes software 605 from storage system 603. Processing system 602 may be implemented within a single processing device, but may also be distributed across multiple processing devices or sub-systems that cooperate in executing program instructions. Examples of processing system 602 may include general purpose central processing units, graphical processing units, application specific processors, and logic devices, as well as any other type of processing device, combinations, or variations thereof.

Storage system 603 may comprise any memory device or computer readable storage media readable by processing system 602 and capable of storing software 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 603 may also include computer readable communication media over which at least some of software 605 may be communicated internally or externally. Storage system 603 may be implemented as a single storage device but may also be implemented across multiple storage devices or sub-systems co-located or distributed relative to each other. Storage system 603 may comprise additional elements, such as a controller, capable of communicating with processing system 602 or possibly other systems.

Software 605 (including NF discovery response process 1006 among other functions) may be implemented in program instructions that may, when executed by processing system 602, direct processing system 602 to operate as described with respect to the various operational scenarios, sequences, and processes illustrated herein. For example, software 605 may include program instructions for maintaining an NRF current state data table, adding NFs to the state data table, monitoring for heartbeat signals to maintain a status listing for NFs, and receiving and responding to NF discovery requests as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software, virtualization software, or other application software. Software 605 may also comprise firmware or some other form of machine-readable processing instructions executable by processing system 602.

In general, software 605 may, when loaded into processing system 602 and executed, transform a suitable apparatus, system, or device (of which computing system 601 is representative) overall from a general-purpose computing system into a special-purpose computing system customized to provide positive resource discovery responses for suspended resources as described herein. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 607 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof.

While some examples provided herein are described in the context of 5G communication networks operated in a cloud environment, it should be understood the systems and methods described herein for positive resource discovery responses for suspended resources are not limited to such embodiments, and may apply to a variety of other communication networks and resource discovery request environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A Network Repository Function (NRF) system, comprising:
   one or more processors; and
   a memory having stored thereon instructions that, upon execution by the one or more processors, cause the one or more processors to:
      store registration information for a plurality of network functions (NFs), wherein the registration information for each of the plurality of NFs comprises a status value;
      receive a discovery request including discovery parameters;
      identify one or more NFs of the plurality of NFs that satisfy the discovery parameters;
      in response to determining the status value of each of the one or more NFs indicates a respective NF is suspended, determine whether a type of the one or more NFs matches a selected type for which a positive discovery response can be provided on suspended NFs;
      generate a discovery response indicating the one or more NFs are available when the type of the one or more NFs matches the selected type;
      generate a discovery response indicating no matching NFs are available when the type of the one or more NFs does not match the selected type; and
      issue the discovery response.

2. The NRF system of claim 1, wherein the instructions comprise further instructions that, upon execution by the one or more processors, cause the one or more processors to:
   receive a heartbeat signal from a first NF of the plurality of NFs at expected intervals;
   in response to receiving the heartbeat signal at an expected interval, set the status value of the first NF to registered, indicating the resource is available; and
   in response to not receiving the heartbeat signal at the expected interval, set the status value of the first NF to suspended.

3. The NRF system of claim 1, wherein the instructions comprise further instructions that, upon execution by the one or more processors, cause the one or more processors to:
   receive a second discovery request comprising second discovery parameters;
   identify a set of NFs of the plurality of NFs that satisfy the second discovery parameters; and
   in response to determining the status value of a first subset of the set of NFs indicates the respective NF is suspended and a second subset of the set of NFs indicates the respective NF is available, generate a second discovery response indicating the second subset of the set of NFs are available and not including any of the first subset of the set of NFs.

4. The NRF system of claim 1, wherein the instructions comprise further instructions that, upon execution by the one or more processors, cause the one or more processors to:
   include a validity period in the discovery response indicating a duration that information in the discovery response remains valid.

5. The NRF system of claim 4, wherein the instructions comprise further instructions that, upon execution by the one or more processors, cause the one or more processors to:
   set the validity period to a first duration shorter than a default duration used in discovery responses including NFs having a status value indicating the respective NF is available.

6. The NRF system of claim 1, wherein the instructions comprise further instructions that, upon execution by the one or more processors, cause the one or more processors to receive an operator input to set the selected type of resource.

7. The NRF system of claim 1, wherein the NRF system operates within a 5G wireless network.

8. The NRF system of claim 1, wherein the instructions comprise further instructions that, upon execution by the one or more processors, cause the one or more processors to:
   determine whether any of the plurality of NFs match the discovery parameters;
   in response to determining that the one or more NFs satisfy the discovery parameters, determine the status value of each of the one or more NFs; and
   in response to determining that none of the plurality of NFs match the discovery parameters, generate the discovery response indicating that no NFs are available.

9. The NRF system of claim 1, wherein the instructions comprise further instructions that, upon execution by the one or more processors, cause the one or more processors to:
   include a priority value in the discovery response for each of the one or more NFs indicating a capacity of a corresponding NF to service a resource transaction.

10. A method comprising:
   operating a network repository function (NRF) of a mobile network, including:
      storing registration information for a plurality of network functions (NFs), wherein the registration information for each of the plurality of NFs comprises a status value;
      receiving a discovery request including discovery parameters;
      identifying one or more NFs of the plurality of NFs that satisfy the discovery parameters;
      in response to determining the status value of each of the one or more NFs indicates a respective NF is suspended, determining whether a type of the one or more NFs matches a selected type for which a positive discovery response can be provided on suspended NFs;

generating a discovery response indicating the one or more NFs are available when the type of the one or more NFs matches the selected type;

generating a discovery response indicating no matching NFs are available when the type of the one or more NFs does not match the selected type; and issuing the discovery response.

11. The method of claim 10 further comprising:

receiving a heartbeat signal from a first NF of the plurality of NFs at expected intervals;

in response to receiving the heartbeat signal at an expected interval, setting the status value of the first NF to registered, indicating the first NF is available; and in response to not receiving the heartbeat signal at the expected interval, setting the status of the first NF to suspended, indicating the first NF is unavailable.

12. The method of claim 10 further comprising:

receiving a second discovery request comprising second discovery parameters;

identifying a set of NFs of the plurality of NFs that satisfy the second discovery parameters; and in response to determining the status value of a first subset of the set of NFs indicates the respective NF is suspended and a second subset of the set of NFs indicates the respective NF is available, generating a second discovery response indicating the second subset of the set of NFs are available and not including any of the first subset of the set of NFs.

13. The method of claim 10 further comprising:

including a validity period in the discovery response indicating a duration that information in the discovery response remains valid.

14. The method of claim 13 further comprising:

setting the validity period to a first duration shorter than a default duration used in discovery responses including NFs having a status value indicating the respective NF is available.

15. The method of claim 10 further comprising setting the selected type based on an input received from an operator.

16. The method of claim 10, wherein the mobile network comprises a 5G wireless network.

17. The method of claim 10 further comprising:

determining whether any of the plurality of NFs match the discovery parameters;

in response to determining that the one or more NFs satisfy the discovery parameters, determining the status value of each of the one or more NFs; and in response to determining that none of the plurality of NFs match the discovery parameters, generating the discovery response indicating that no NFs are available.

18. The method of claim 10 further comprising:

including a priority value in the discovery response for each of the one or more NFs indicating a capacity of a corresponding NF to service a resource transaction.

* * * * *